United States Patent Office 3,010,812
Patented Nov. 28, 1961

3,010,812
STABILIZATION OF ORGANIC COMPOUNDS
William K. T. Gleim, Island Lake, Ill., assignor, by mesne assignments, to Universal Oil Products Company, Des Plaines, Ill., a corporation of Delaware
No Drawing. Filed Sept. 19, 1958, Ser. No. 761,926
2 Claims. (Cl. 44—78)

This application is a continuation-in-part of my copending application Serial No. 629,482, filed December 20, 1956, now abandoned.

This invention relates to the stabilization of organic compounds which tend to deteriorate in storage or in use due to oxidation or other reactions, and more particularly to the use of antioxidants comprising 3-alkoxy-5-alkylcatechols.

The novel method of the present invention is utilized for the stabilization of various organic materials which are unstable in storage, during treatment and/or in use, and include motor fuel, jet fuel, diesel oil, mineral oil, lubricating oil, fuel oil, drying oil, greases, waxes, rubber, edible fats and oils, forage crops, monomers including styrene, butadiene, isoprene, acetylenes, etc., various unsaturated alcohols, acids, ketones, etc. These materials are adversely affected by oxygen with the resultant formation of undesirable gums, discoloration, rancidity and/or other deleterious reaction products.

The invention is particularly applicable to the stabilization of motor fuels and still more particularly to unsaturated gasolines including cracked gasoline, polymer gasoline, etc. In storage or during transportation and/or treatment these unsaturated gasolines tend to form undesirable gums and/or undergo discoloration. The invention is also applicable to the treatment of aviation gasolines which tend to undergo deterioration due to the addition of tetraethyl lead fluid or due to other components in the gasoline.

The invention is also particularly applicable to the stabilization of edible and inedible fats and oils, which may be of animal, vegetable or mineral origin and which tend to become rancid especially during long periods of storage prior to use. Typical representatives of the edible fats and oils include linseed oil, menhadin oil, cod liver oil, caster oil, olive oil, rapeseed oil, coconut oil, palm oil, corn oil, sesame oil, peanut oil, babassu oil, butter, fat, lard, beef tallow, etc. It is understood that other oils and fats may be treated within the scope of this invention including oils and fats which previously had been subjected to various treatments such as blowing with air, heat treatment, hydrogenation, etc.

It is also contemplated that the present invention may be applied to the treatment of crops by dusting or spraying in order to preserve food excessory factors such as carotene, vitamins, various fatty acids, alcohols, etc., or that the inhibitor may be incorporated in materials which contain food products as, for example, paraffin wax which is used to coat containers for food products, cardboard or other paper products used for packaging food products, etc.

It is, therefore, an object of this invention to stabilize the abovementioned organic materials and others by incorporating therein a 3-alkoxy-5-alkylcatechol.

Another object of this invention is to stabilize gasoline which is subject to oxidative deterioration by adding thereto a 3-alkoxy-5-alkylcatechol.

One embodiment of the invention resides in a method of stabilizing an organic material normally subject to oxidative deterioration which comprises incorporating therein, as an inhibitor against said deterioration, an antioxidizing amount of a 3-alkoxy-5-alkylcatechol.

A further embodiment of the invention is an organic material normally subject to oxidative deterioration containing, as an additive to retard said deterioration, an antioxidizing amount of a 3-alkoxy-5-alkylcatechol.

A specific embodiment of the invention is a method of stabilizing an organic material normally subject to oxidative deterioration which comprises incorporating therein, as an inhibitor against said deterioration, 3-methoxy-5-methylcatechol in a concentration of from about 0.0001% to about 1% by weight of said organic material.

Another specific embodiment of the invention resides in gasoline normally subject to oxidative deterioration containing, as an additive to retard said deterioration, an antioxidizing amount of a 3-alkoxy-5-alkylcatechol.

A more specific embodiment of the invention relates to a method of stabilizing gasoline normally subject to oxidative deterioration which comprises incorporating therein, as an additive to retard said deterioration, from about 0.0001% to about 1% by weight of 3-methoxy-5-methylcatechol.

Other objects and embodiments referring to alternative inhibitors will be found in the following further detailed description of the invention.

It is known from the prior art that polyhydroxy aromatic compounds and particularly pyrogallol may be used as antioxidants. However, the fact that pyrogallol is an effective antioxidant in gasoline is of theoretical value only inasmuch as pyrogallol is not readily soluble in the gasoline. In order to obtain any data relating to the induction period of pyrogallol, an organic solvent or diluent such as isopropyl alcohol or acetone, must be added to the gasoline in order to solubilize the pyrogallol. In an attempt to increase the gasoline solubility of pyrogallol, pyrogallol was subjected to alkylation. The alkyl groups which condense with the pyrogallol may be introduced into two fundamentally different positions. One position is to etherify the pyrogallol by the O-alkylation thereof, the other possibility being the alkylation of the aromatic nucleus itself. However, a deterring factor in the alkylation of pyrogallol to form either the ether or the alkyl substituted pyrogallol is the fact that when either of these operations is carried out by itself, the inhibiting power of the resulting compound is greatly reduced. For example, the prior art discloses the use of such oxidation inhibitors as decylpyrogallol, ethyloctylpyrogallol, hexylpyrogallol, butylpyrogallol, monomethoxypyrogallol, dimethoxypyrogallol, methoxyhydroquinone, methoxyphloroglucinol, etc. However, the inhibitor potency of these compounds is less than that of pyrogallol itself. Furthermore, it has been found that when the polyhydroxy aromatic compound such as pyrogallol, hydroxyhydroquinone, etc., is etherified, in some instances the inhibiting power may not be greatly decreased, but the gasoline solubility is also not greatly increased.

However, I have now discovered that a totally new and unexpected molar oxidation inhibitor effectiveness of a substituted polyhydroxy aromatic compound such as a substituted pyrogallol is found when pyrogallol is both etherified and nuclearly alkylated. When these two procedures are combined, the inhibitor potency of pyrogallol, especially when introducing one methyl group into a phenolic group and another methyl group into the benzene ring, is almost restored on a weight basis and is surpassed on a molar basis. This result is new and unexpected inasmuch as the combination of two factors, each of which per se tends to decrease the inhibitor potency, combine to give a compound which possesses a very high inhibitor potency. In addition, besides possessing a high degree of potency as an inhibitor, the etherified and nuclearly alkylated pyrogallol is readily soluble in gasoline and poorly soluble in water.

Compounds possessing oxidation inhibitor activity which may be used in the process of this invention include 3 - methoxy - 5 - methylcatechol, 3 - ethoxy - 5 - methylcatechol, 3-methoxy-5-ethylcatechol, 3-ethoxy-5-ethylcatechol, etc. For purposes of this invention the monoalkylether of pyrogallol containing an alkyl substituent is to be named as a catechol derivative and more particularly as a 3-alkoxy-5-alkylcatechol. It is to be understood that the inhibitors of the present invention may comprise the specific compounds named herein as well as these compounds in admixture with various isomers thereof.

The oxidation inhibitors of the present invention may be prepared in any suitable manner. A 2,6-dialkoxy-4-alkylphenol such as, for example, 2,6-dimethoxy-4-methylphenol may be dissolved in glacial acetic acid, saturated with a halo acid such as hydrobromic acid or hydrochloric acid and the solution placed in an appropriate apparatus. The partial splitting or partial dealkylation of the dialkoxyalkyl phenols is then accomplished by heating the apparatus for a predetermined period of time or by letting it stand at ambient temperature for several days. At the end of this time the separation of the starting material (the dialkyl ether) from the desired reaction product (the mono-alkyl ether) is accomplished by removing the reaction medium. This removal is accomplished by flashing off the medium under reduced pressure and treating the residue with a basic substance such as an alkali or alkaline earth metal hydroxide. The treatment with the basic substance precipitates the insoluble salts of the starting material while the desired reaction product remains soluble. The resulting mixture is filtered, the filtrate acidified with a strong acid and extracted with ether, the desired product being recovered therefrom.

The oxidation inhibitors of the present process may also be prepared by halogenating a 3-alkoxy-4-hydroxybenzaldehyde in an appropriate apparatus, the preferred halogenating agent comprising bromine or chlorine. If so desired, the halogenation may take place in the presence of an inert organic diluent such as glacial acetic acid or carbon tetrachloride. The resultant 3-alkoxy-4-hydroxy-5-halobenzaldehyde is separated from unreacted starting materials and halogenating agent and placed in an appropriate apparatus such as an autoclave where the halogenated aryldehyde is treated with a hydrolyzing agent at an elevated temperature in the presence of a copper catalyst for a predetermined period of time. At the end of this time the reaction mixture is acidified, cooled and separated by filtration from any unreacted starting materials, side reactions, etc. The filtrate is then extracted with ether and recrystallized after which the 3-alkoxy-4,5-dihydroxy benzaldehyde is reduced by being subjected to a stream of hydrogen in the presence of a reducing catalyst to prepare the desired end product comprising a 3-alkoxy-5-alkylcatechol.

The oxidation inhibitor of the present invention generally is incorporated in the organic material to be stabilized in an amount of below about 1% by weight and preferably in an amount within the range of from about 0.0001% to about 1% by weight and more particularly in a concentration of from about 0.001% to about 1% by weight. When used in gasoline, it is understood that the inhibitor compound may be used in conjunction with various dyes, synergists, metal deactivators, antiknock agents such as tetraethyl lead, iron carbonyl, etc., rust inhibitors, etc. When used in fatty material, the inhibitor compound may be used in conjunction with synergists such as citric acid, phosphoric acid, ascorbic acid, etc., and/or in combination with other inhibitors and other compounds added for specific purposes. The inhibitor may be utilized as such or in a suitable solvent, including hydrocarbons, alcohols, glycols, ethers, ketones, etc. When desired, the inhibitor compound may be marketed as a solution along with other additives to be incorporated in the organic materials.

The following examples are given to illustrate the process of this invention, which, however, are not intended to limit the generally broad scope of the present invention in strict accordance therewith.

EXAMPLE I

A. 160 g. of 4-methyl-2,6-dimethoxyphenol were dissolved in 250 g. of glacial acetic acid containing 32% hydrobromic acid. This solution was placed in a glass-lined autoclave and heated to 100° C. for 6 hours without agitation. Most of the glacial acetic acid plus hydrobromic acid was flashed off under reduced pressure. The residue was dispersed in 1 liter of 20% sodium hydroxide, after which the precipitate was filtered, the filtrate was acidified with concentrated hydrochloric acid and extracted with ether. The ether was evaporated and the residue distilled at 92–94° C./at 0.2 mm. The yield was 50 g. of 3-methoxy-5-methylcatechol, while 42 g. of the starting material were obtained from the insoluble sodium salt. The distillate was recrystallized from Skellysolve C containing 5% benzene, the crystals having a melting point of 65° C.

*Analysis*

|  | Percent C | Percent H | Percent O | Percent $OCH_3$ | Molecular weight |
|---|---|---|---|---|---|
| Calc | 58.9 | 6.8 | 34.3 | 19.0 | 163 |
| Found | 62.56 | 6.33 | 31.34 | 20.02 | 158 |

B. One hundred and five g. of $Br_2$ in 200 ml. glacial acetic acid was added to 100 g. vanillin dissolved in 200 ml. glacial acetic acid. The bromovanillin was filtered and recrystallized from 95% alcohol yielding 118 g., having a melting point of 163–164° C.

Thirty-nine g. of 5-bromovanillin, 12 g. copper bronze and 600 ml. 8% sodium hydroxide were heated in the rotating autoclave at 200–210° C. during one hour. The reaction mixture was then acidified with dilute sulfuric acid, cooled with ice and filtered from amorphous material. The filtrate was extracted with ether, concentrated to half its volume and extracted again with ether. The filtrate was concentrated again to half its volume and extracted with ether. The combined ether extracts were evaporated and the residue extracted with hot benzene from which the 4,5-dihydroxy-3-methoxybenzaldehyde crystallized, the crystals having a melting point of 129° C.

Nineteen and one-half g. of 4,5-dihydroxy-3-methoxybenzaldehyde were dissolved in 150 ml. glacial acetic acid, and hydrogenated under 60 pounds hydrogen pressure with 5 g., 5% Pd on charcoal at room temperature until no more hydrogen was taken up. The reaction mixture was then filtered from the catalyst, the glacial acetic acid evaporated under reduced pressure and the residue distilled at 92–94° C./at 0.2 mm. The distillate was recrystallized from Skellysolve C, M.P. 65° C. No melting point depression was observed, when the crystals thus obtained were mixed with a material obtained by partial ether splitting of the 2,6-dimethoxy-4-methylphenol as set forth in part A of this example.

EXAMPLE II

The 5-methylpyrogallol used as a comparison to the oxidation inhibitors of the present process was prepared by mixing 60 g. of 2,6-dimethoxy-4-methylphenol with 100 g. of glacial acetic acid containing 32% HBr in a thick walled glass bottle which was then securely stoppered. The mixture was heated to a temperature of about 85° C. for approximately 6 hours, after which the sealed bottle was first cooled in ice water and then opened. The hydrobromic acid and glacial acetic acid were evaporated and the residue distilled at a reduced pressure of 0.6 mm. The nondistillable bottoms were dissolved in water and filtered, after which most of the water was evaporated and the remainder removed by distillation with benzene. The resulting benzene solution was concentrated and left to crystallize. The resulting crystals were recrystallized three times with benzene, said crystals comprising 5-methylpyrogallol having a melting point of 127–129° C.

EXAMPLE III 3-methoxycatechol which is the monomethyl ether of pyrogallol was prepared by dissolving 100 g. of 2,6-dimethoxyphenol in 100 g. of 32% hydrobromic acid in glacial acetic acid and heated in an autoclave at a temperature of 85° C. for 5½ hours. The methyl bromide, hydrobromic acid and glacial acetic acid were evaporated under reduced pressure and the residue was dissolved in 400 ml. of 10% sodium hydroxide and filtered from the insoluble sodium salt of 2,6-dimethoxyphenol. The filtrate was acidified with sulfuric acid and extracted with ether several times, after which the combined extracts were dried and evaporated. The residue was distilled at 91° C. and under a reduced pressure of 0.8 mm. 50 g. of the desired product, comprising 3-methoxycatechol having a melting point of 38–41° C. was recovered.

EXAMPLE IV

A group of compounds including the compounds prepared in Examples I, II and III above were subjected to an oxidation inhibition test to determine the inhibition activity and molar inhibitor effectiveness of the compounds. The gasoline used in this example was a caustic washed, thermally cracked gasoline which had an induction period of 50 minutes. 0.01% by weight of the various compounds hereinafter set forth were incorporated into different samples of the gasoline. The inhibitor comparison of the compounds appear in Table I below.

TABLE I

| Compound | Molecular weight | Induction period in minutes at 0.01% concentration | Effectiveness ratio relative to pyrogallol on a molar basis |
| --- | --- | --- | --- |
| None | | 50 | |
| Pyrogallol | 126 | 745 | 1.00 |
| 3-methoxycatechol | 140 | 610 | 0.90 |
| 2,6-dimethoxyphenol | 154 | 140 | 0.15 |
| 1,2,3-trimethoxybenzene | 168 | 50 | 0.0 |
| 5-methylpyrogallol | 140 | 314 | 0.44 |
| 5-n-propylpyrogallol | 168 | 325 | 0.54 |
| 2,6-dimethoxy-4-n-propylphenol | 196 | 140 | 0.21 |
| Catechol | 110 | 675 | 0.90 |
| Guaiacol | 124 | 65 | 0.03 |
| Creosol | 138 | 130 | 0.14 |
| 3-methoxy-5-methylcatechol | 154 | 680 | 1.13 |

Therefore, it is readily apparent from the above table that when using pyrogallol as a standard the compounds which were either O-alkylated, that is etherified, or nuclearly alkylated exhibited a lower effectiveness relative to pyrogallol on a molar basis while the compound which was both O-alkylated and nuclearly alkylated (3-methoxy-5-methylcatechol) disclosed an effectiveness ratio greater than that of pyrogallol on a molar basis. As hereinbefore set forth this result was totally new and unexpected inasmuch as one would expect a further drop in effectiveness based on the prior knowledge that compounds were either etherified or nuclearly alkylated showed a lower effectiveness than that of pyrogallol.

EXAMPLE V

The oxidation inhibitors of the present invention were also tested for activity in a different substrate such as lard. The lard used in this example had a normal stability period of 6 hours as determined by the "Swift test." This test was described in detail in the article by A. E. King, H. L. Roschen and W. H. Irwin, which appeared in Oil and Soap, pp. 105–109, June 1933, and modified as described in the article by R. W. Reimenschneider, J. Turer and R. M. Spec, which appeared in Oil and Soap, pp. 169–171, September 1943. In general, this test comprises bubbling air through a sample of the lard and reporting the number of hours until the lard develops a peroxide value of 20. The inhibitor used in this example is 3-methoxy-5-methylcatechol, which was incorporated in a concentration of 0.02% by weight in a sample of the lard. The results of this experiment appear in Table II below.

TABLE II

| Compound | Concentration, percent | A.O.M. time in hours |
| --- | --- | --- |
| None | | 6 |
| 3-methoxy-5-methyl-catechol | 0.02 | 133½ |
| Do | 0.005 | 57 |

I claim as my invention:

1. Organic material selected from the group consisting of hydrocarbon and fatty substances normally subject to oxidative deterioration containing, as an additive to retard said deterioration, an antioxidizing amount of an inhibitor consisting essentially of 3-methoxy-5-methylcatechol.

2. Gasoline normally subject to oxidative deterioration containing, as an additive to retard said deterioration, an inhibitor consisting essentially of 3-methoxy-5-methylcatechol in an amount of from about 0.0001% to about 1% by weight of said gasoline.

References Cited in the file of this patent

UNITED STATES PATENTS

| | | |
| --- | --- | --- |
| 1,889,836 | Lowry et al. | Dec. 9, 1932 |
| 1,959,316 | Rather et al. | May 15, 1934 |
| 1,999,830 | Calcott et al. | Apr. 30, 1935 |
| 2,047,355 | Borden | July 14, 1936 |
| 2,050,689 | Briod | Aug. 11, 1936 |
| 2,831,817 | Ecke et al. | Apr. 22, 1958 |
| 2,908,719 | Block et al. | Oct. 13, 1959 |

OTHER REFERENCES

Schultes: 69 Berichte Deu. Chem., 1936, pp. 1870–73.